United States Patent [19]

Billard

[11] Patent Number: 4,695,841

[45] Date of Patent: Sep. 22, 1987

[54] METHOD FOR DECEIVING ACTIVE ELECTROMAGNETIC DETECTORS AND CORRESPONDING DECOYS

[75] Inventor: Alain Billard, Muret, France

[73] Assignee: Societe E. Lacrois - Tour Artifices, France

[21] Appl. No.: 821,502

[22] Filed: Jan. 21, 1986

Related U.S. Application Data

[63] Continuation of Ser. No. 454,683, Dec. 30, 1982, abandoned.

[30] Foreign Application Priority Data

Dec. 30, 1981 [FR] France ................................ 81 24523

[51] Int. Cl.[4] .......................... G01S 7/42; H01Q 17/00

[52] U.S. Cl. ............................................ 342/8; 342/9

[58] Field of Search ........... 244/3, 153 R, 154, 155 R; 343/18 A, 18 B, 18 C, 18 D, 18 E, 18 R, 880, 881, 882, 885, 886, 912, 915, 916; 342/8, 9, 10

[56] References Cited

U.S. PATENT DOCUMENTS

| | | | |
|---|---|---|---|
| 835,648 | 11/1906 | Straubel | 343/18 C |
| 2,823,376 | 2/1958 | Baldwin | 343/18 C |
| 3,010,103 | 11/1961 | Hopper et al. | 343/18 D |
| 3,019,432 | 1/1962 | Johnston, Jr. | 343/18 R |
| 3,115,631 | 12/1963 | Martin | 343/18 C |
| 3,217,325 | 11/1965 | Mullin | 343/18 C |
| 3,229,290 | 1/1966 | Fisher | 345/18 B |
| 3,229,291 | 1/1966 | Dell'aria et al. | 343/18 E |
| 3,229,292 | 1/1966 | Dell'aria et al. | 343/18 E |
| 3,276,017 | 9/1966 | Mullin | 343/18 C |
| 3,365,790 | 1/1968 | Brauer | 343/18 R |
| 3,568,191 | 3/1971 | Hiester | 343/18 E |
| 3,660,843 | 5/1972 | Wolff | 343/18 C |
| 4,028,701 | 6/1977 | Parks et al. | 343/18 C |
| 4,072,948 | 2/1978 | Drews et al. | 343/18 C |
| 4,096,479 | 6/1978 | Van Buskirk | 343/18 C |
| 4,104,634 | 8/1978 | Gillard et al. | 343/18 C |
| 4,115,775 | 9/1978 | Harrington | 343/18 B |
| 4,119,965 | 10/1978 | Kaszyk | 343/18 C |

OTHER PUBLICATIONS

Random House Dictionary, Random House 1975, p. 1404.

*Primary Examiner*—Deborah L. Kyle
*Assistant Examiner*—Brian S. Steinberger

[57] ABSTRACT

A rope is pulled between an end member such as a parachute forming a sail with regard to the wind and a main floating anchor located at the other end. This rope is connected at chosen intervals to captive-balloons, each associated with secondary floating anchors. The captive-balloons are chosen to be sensitive to the wind in order to incline themselves with respect to the floating anchor and to respectively support decoys formed by sets of retroreflective trihedrons. Advantageously, the decoys are individually connected in their lower part to floating bodies such as slightly inflated and loaded balloons. The invention has application, in particular, to the simulation of large surface ships.

3 Claims, 10 Drawing Figures

METHOD FOR DECEIVING ACTIVE ELECTROMAGNETIC DETECTORS AND CORRESPONDING DECOYS

This is a continuation of co-pending application Ser. No. 06/454,683 filed on Dec. 30, 1982 now abandoned.

The present invention relates to electromagnetic decoys.

Missile weapons systems are frequently equipped with a guidance arrangement comprising an active electromagnetic detector, of the radar or laser type for example. The same is true for the control of firing, which may also be directed from information obtained by detectors of the same type. In a similar case, the principle means of defence consists of preparing a decoy able to deceive the electromagnetic detector, in order to divert it from the real target, of which it should completely loose track.

The main type of electromagnetic decoy used hitherto is based on flakes of metallized glass fibre of chosen length, frequently known as "chaff". These flakes form a reflector for a wavelength which is linked with their size. Furthermore they have the property of remaining suspended in the air for a relatively long period of time, since they are very light. Consequently, by creating quite a dense cloud of flakes of this type, of chosen varied lengths, one is able to create a considerable electromagnetic echo, which makes it possible to simulate a target and consequently to divert the threat from the real target. Although this type of decoy has proved very useful, it does have problems as regards application. In fact, the active means for electromagnetic detection tend to become increasingly smaller and consequently to be capable of at least embryonic recognition. It is thus very difficult with clouds of flakes to obtain a desired shape and above all to maintain the latter over a period of time. In particular, the present invention intends to provide a new solution to this problem, which is essentially a problem of credibility, accompanied by other technical problems which will be discussed hereafter.

Basically, the present invention proposes a method for deceiving active electromagnetic detectors, a method which comprises the use of at least one set of retroreflective trihedrons.

According to a particularly advantageous feature of the invention, which can be used in particular for the protection of ships at sea, this set of trihedrons comprises a system of adjacent trihedrons mounted head to tail.

The retroreflective properties of trihedrons for an electromagnetic radiation are already known. Trihedrons, also known by the name of "cube corners" are used in particular in telemetry. In optics, the most recent construction is based on glass. In fact, extremely precise surfacing is necessary, which surfacing is accompanied by the formation of sharp edges.

In a quite unexpected manner, the applicant has observed that trihedrons function in an equally satisfactory manner when the edges of the trihedrons are not sharp, but rounded. This characteristic facilitates the practical use of the said sets of retroreflective trihedrons.

According to another feature of the invention, the system of adjacent trihedrons mounted head to tail comprises a panel of adjacent lines or rows of identical trihedrons, mounted to pivot one with respect to the other. This possibility of folding with the lines of trihedrons fitting one against the other makes it possible to store them in a very compact form, inside launching ammunition, as will be seen hereinafter.

The present invention also proposes a method for defending surface ships, which method is thus used at sea and which consists of deploying at leat one set of trihedrons of the aforesaid type at an altitude of between approximately 3 and 20 metres. In turn, the basic trihedrons, which are preferably identical, have an edge which measures between 2 and 20 centimetres.

With one set of trihedrons, it is possible to simulate a small ship.

Another feature of the invention proposes an improved method, capable of simulating a large ship and according to which a substantially horizontal alignment of interconnected sets of trihedrons is developed. At least one of the sets of trihedrons comprises two substantially perpendicular panels. One thus obtains a virtually isotropic retroreflection property, however with small areas of shadow which in themselves are advantageous: in fact when the two panels turn together about themselves, they make it possible to produce variations. This prevents the decoy from being recognizable due to the fact that it returns the emissive electromagnetic radiation too perfectly.

In a particular embodiment of this method, the set or sets of trihedrons are suspended from respective captive-balloons.

The latter may be a swinging suspension, the captive-balloon in turn being connected to a floating anchor. These balloons are preferably shaped in order to link their aerostatic thrust with aerodynamic lift in the wind encountered.

In one advantageous variation, one can also provide means for urging the sets of decoys downwards, these means advantageously being able to comprise a member able to trail on the ground, such as a laden balloon inflated to a small extent. The connection between the carrier captive-balloon and the lower balloon, or simply the swinging suspension of the set of trihedrons from its carrier captive-balloon, are in both cases arranged so that the sets of trihedrons may rotate about themselves.

In order to simulate a ship having a large surface, the suspensions of a certain number of sets of trihedrons are interconnected by means of a rope, mounted between a pulling member, which may be a device of the sail type, for example a parachute, or even a gas generator and a retaining member, which is a floating anchor which will be referred to as the main floating anchor, since it is more important than the floating anchors connected to the individual carrier balloon.

In practice, 3 to 10 sets of trihedrons aligned in this way will be used, the ends advantageously comprising a single panel of trihedrons, whereas the intermediate sets comprise two of the latter arranged in a perpendicular manner.

The present invention also relates to an electromagnetic decoy making it possible to carry out this method.

The electromagnetic decoy has a reversible cellular structure, at least one part of the hollow cells being provided with a reflective coating in the form of a trihedron.

The structure is advantageously made from plastics material which is injected or cast under pressure, or even from a pressed sheet of light alloy.

Another embodiment of said structure, which is also very advantageous, consists of pouring an epoxy resin under vacuum onto a glass fibre fabric located between two moulds comprising optical surfacing, the moulds also comprising a reflective coating which is transferred to the resin after moulding.

Further features and advantages of the invention will become apparent on reading the ensuing detailed description, made with reference to the accompanying drawings and given in order to illustrate a preferred embodiment of the present invention in a non-limiting manner and in which.

Figure 1:
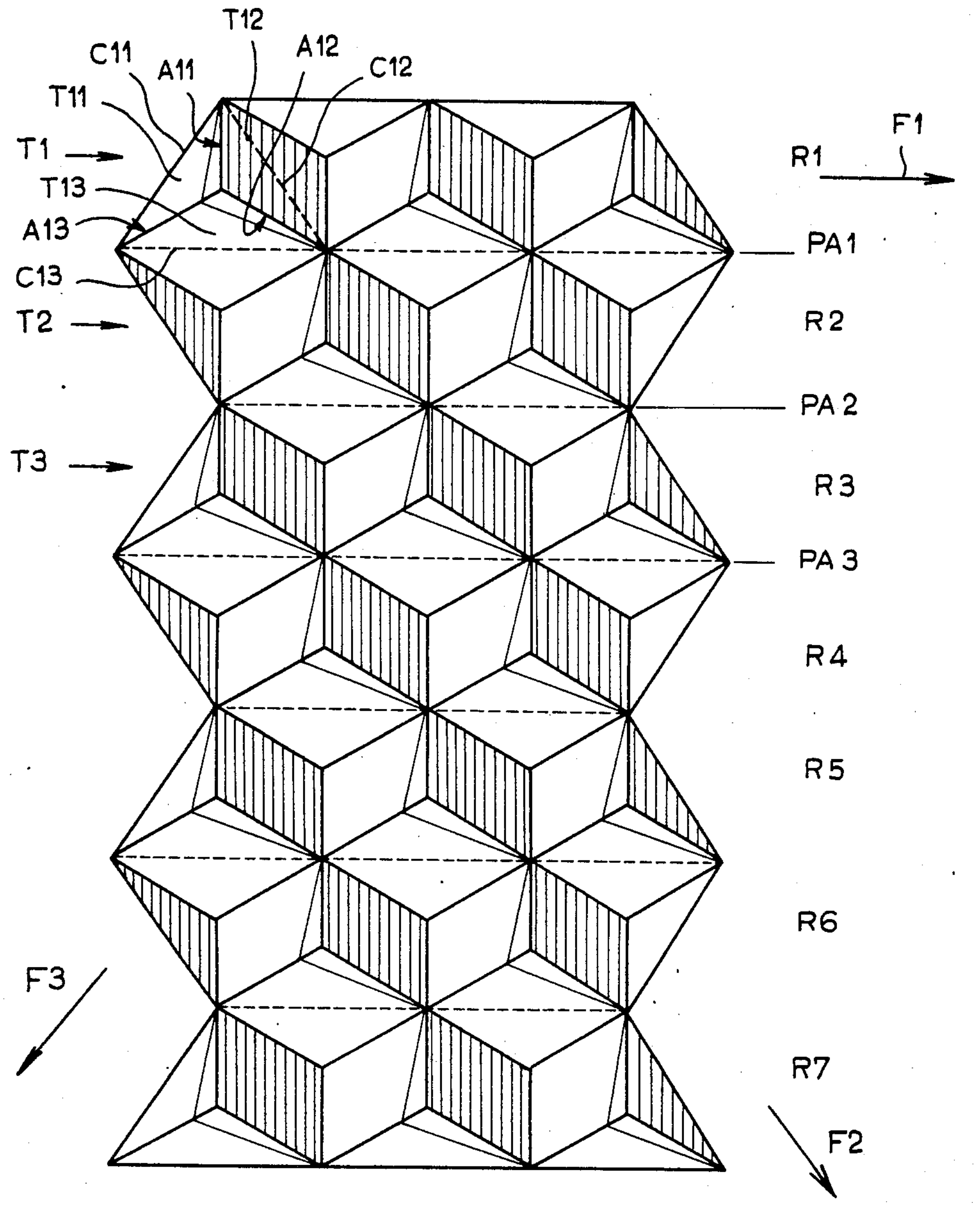
FIG. 1 is a diagrammatic illustration of a panel of trihedrons according to the present invention.

FIG. 1 shows a panel of trihedrons according to the invention, in the form of a view from the shaded side. In this case, the panel is composed of seven rows or lines of trihedrons, bearing the reference numerals R1 to R7. The row R1 comprises three trihedrons directed towards the front, completed by two trihedrons directed towards the rear. The first trihedron at the top and on the left, bearing the reference numeral T1, is constituted by three orthogonal faces T11,T12 and T13, separated from each other by the edges A11,A12 and A13. This structure can be reproduced for all the other trihedrons. It will also be noted that the essential part of the trihedron as regards electromagnetic retroreflection, defined by the equilateral triangle, whose sides are C11,C12 and C13, is non-deformable. Located immediately adjacent to the row R1 is the second row R2, which is composed of three trihedrons directed towards the rear interspersed with two trihedrons directed towards the front. The row R3 adopts the structure of the row R1, then the row R4 that of the row R2 and so on alternately as far as the row R7. The references T2 and T3 designate the first trihedrons on the left of the rows R2 and R3, T2 being directed towards the rear and T3 towards the front. In the illustration of FIG. 1, the lower face of the trihedron T1 is shown as a continuation of the upper face of the trihedron T2, which may in practice be put into operation. However, according to the present invention, it is considered as clearly preferable to provide pivot axes such as PA1, PA2 and PA 3 between the various rows of trihedrons, which makes it possible to fold them over one against the other, the cubes such as T1,T2 and T3 fitting within and receiving one another in the manner illustrated in FIGS. 2A and 2B. An extremely compact structure is thus obtained. Naturally, according to the size of the trihedrons as well as the geometry of the mass available, one could provide the pivot axis not between each of the rows but between the rows taken in pairs, or even in threes for example.

One can immediately see that the panel of FIG. 1 has the aforementioned reversible cellular structure, whereof at least one part of the hollow cells is provided with a reflective coating in the form of a trihedron.

As mentioned previously, trihedrons of this type have already been used as retroreflectors within the framework of optical measurements. For applications of this type, they are naturally give very careful optical surfacing treatment, since their smoothness is relatively important, as well as very sharp edges A11,A12 and A13. Under these conditions, whatever its orientation, the cube reflects incident electromagnetic radiation in the direction from which it comes.

One of the starting points of the present invention is the observation that the trihedrons continue to operate in a satisfactory manner for the construction of electromagnetic decoys, even if their edges A11,A12 and A13 are rounded. First of all, with reasonable economic conditions, this makes it possible to manufacture panels of trihedrons of the type shown in FIG. 1.

Although the phenomenon has not yet been completely explained, it seems that rounded edges contribute to satisfactory operation of the device as a decoy, by producing irregularities in the response of the decoy according to its orientation, as well as in its response to incident electromagnetic waves of any polarization.

One could naturally produce the decoy panel of FIG. 1 from a structure of plastics material injected or cast under pressure, or even from a stamped sheet of light alloy. In order to obtain a reflective coating of optical quality, the panel is metallized by an operation of the galvanoplasty type, glazed with an electrostatic deposition of aluminium, or even metallization under vacuum.

In the case of a structure consisting of a light alloy sheet, the pivot axes such as PA1, . . . could easily be produced by thin hinges of the piano-hinge type. Depending on the thickness of the material and the shape of its cut-out in the vicinity of the hinges, care should be taken to produce the pivot points in a manner making it possible to ensure suitable folding. It will be noted that in the particular case of FIG. 2A, the pivot point is alternately on one side then the other;

at the intersection between the thihedrons T1 and T2 the pivot is on the left.

For a structure consisting of plastics material injected or cast under pressure, pivoting may be achieved in the same way, or even by the insertion of a deformable material between the two blocks of plastics material.

In another embodiment, presently considered as particularly advantageous, the structure consists of epoxy resin on glass fibre fabric.

More particularly, two corresponding moulds are provided, consisting of glass with optical surfacing, the shapes of which correspond to the two sides of the panel of FIG. 1. Optical surfaces of these moulds are previously provided with a suitable reflective coating, which is kept in place by means of a medium strength adhesive. Between the two moulds, a glass fibre fabric will be produced, preferably with the aid of three interlaced strips. The first strip of glass fibre will pass over the faces such as T11 and T12 and will thus follow the general direction of the rows R1,R2 . . . , in the direction of arrow F1. The second strip of glass fibre will follow the faces such as T11 and T13, thus assuming the direction of the diagonal or orientation F2 in FIG. 1. Finally, the third strip of glass fibre will follow the faces such as T12 and T13, thus assuming the direction of arrow F3. It can be seen immediately that each face of the trihedron is defined by the superimposition of two parts of the said glass fibre strips. On each occasion, the strips are preferably cut out in order to follow the staircase profile corresponding to the width of the individual trihedron. After having placed the glass fibre fabric defined in this way between the two moulds, an epoxy resin is poured under vacuum between the moulds. After polymerization, the epoxy resin retains the reflective coating, which adheres more to the latter than to the glass mould. In view of the fact that the outer surface of this coating has been defined by the optical surface of the mould, a reflective coating of optical quality is thus obtained directly on a moulded structure of epoxy resin, which is also very strong on account of its glass fibre reinforcement.

The moulding unit may have a size which depends on the position of the pivot axes. If one wishes to have a pivot axis between each row of trihedrons, one could thus provide a mould for a single row of trihedrons, which makes it possible to leave the area of the pivot point PA1 bare of epoxy resin. One thus easily obtains a pivot axis which is based on the flexibility of uncoated fibre glass. One then recommences, by reversing the moulds, for the row R2 and so on. If, on the contrary, one wishes to have pivot points every other row of moulds, one will then have a mould of a shape corresponding to the block of rows R1 and R2, with the corresponding mould on the other side, the arrangement being moved by simple translation. If the rigid basic unit comprises three rows of trihedrons, the mould will be of corresponding shape. Here too, it will be necessary to reverse the moulds on each occasion.

With reference to FIG. 1, it has been shown that the most active part of a trihedron is defined by the equilateral triangle C11,C12 and C13. Within the framework of the aforementioned moulding, one could limit the coating fixed previously to the mould to what corresponds to this useful part of the trihedron to be obtained. Similarly, before or after moulding, one could also apply to the retroreflective coating any design or modification which could be useful for satisfactory use as a decoy, in particular as regards the retroreflection of waves polarized in a circular manner.

As a particular example of a structure of plastics material injected or cast under pressure, one could use materials known by the trade marks PERSPEX or ALTUGLAS, equipped with a non-wetting reflective coating. One may also use polycarbonates such as MARKOLON.

As an example of a sheet of light alloy, one could use aluminum, possibly provided with a retroreflective coating, if necessary.

As an example of an epoxy resin, one could use products of the type known by the name of ARALDITE (registered trade mark).

After having described the basic electromagnetic decoy, we shall now move on to its method of use. Although at the limit, this method may use rigid panels of trihedrons, which may be different from each other, in the following description it will be assumed that each set of trihedrons comprises at least one panel of adjacent lines of trihedrons mounted to pivot one on the other.

Furthermore, although the trihedrons may have other applications, where they could possibly adopt shapes in a network other than the shapes of a panel, it will now be assumed that it is a question of defending a ship on the surface of the sea.

In its basic version, the method for deceiving active electromagnetic detectors consists of deploying at least one set of trihedrons at an altitude of between approximately 3 and 20 metres.

Figure 3:
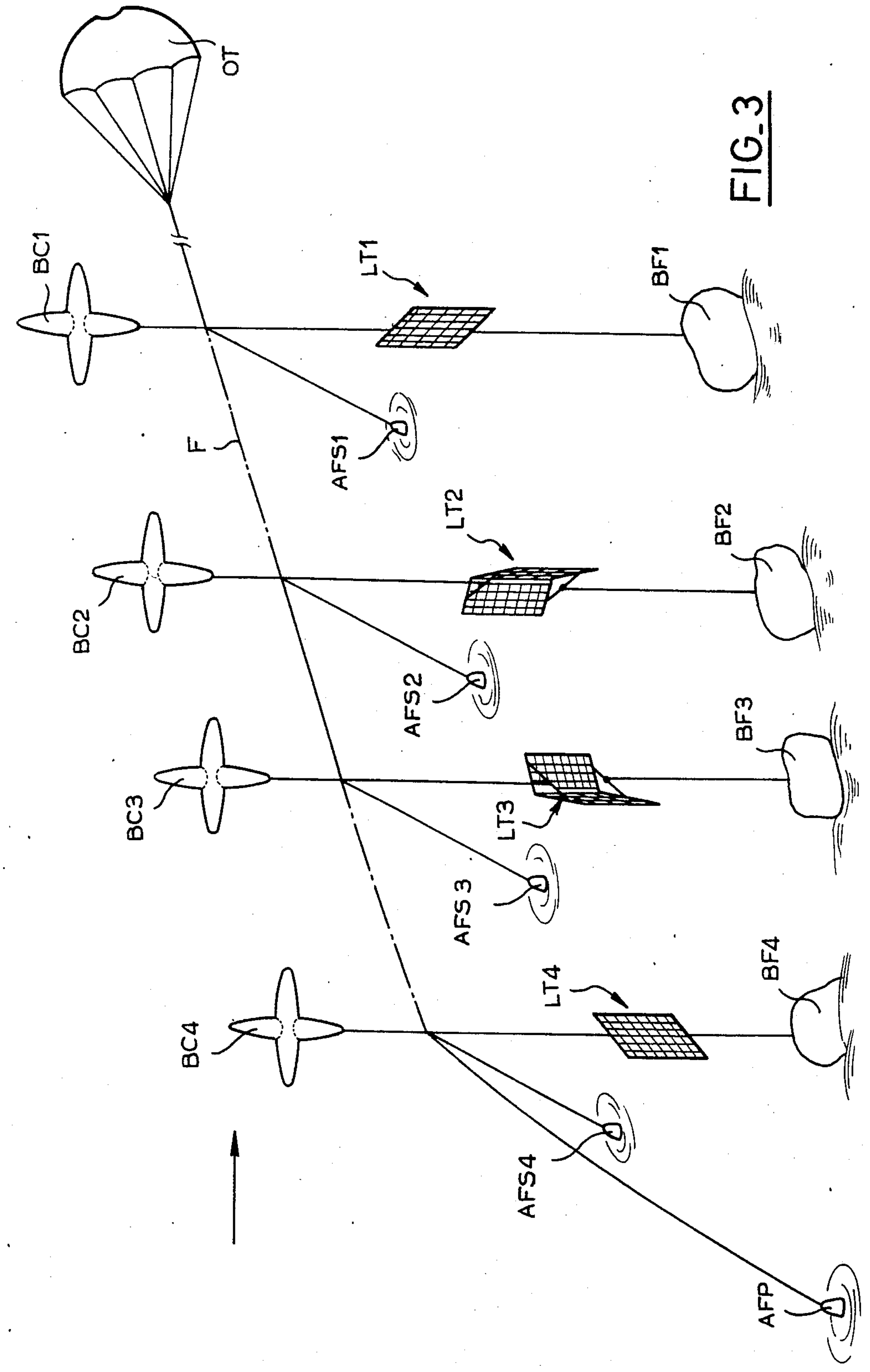
FIG. 3 is a diagrammatic perspective view showing the deployment of an arrangement of decoys for simulating a surface ship.

If we refer to FIG. 3, a set of trihedrons may be deployed by means of a captive-balloon BC1, connected by a rope to a floating anchor AFS1 and supporting the set of trihedrons LT1, which is preferably urged downwards by a floating body BF1, which is advantageously a slightly inflated loaded balloon. The captive-balloon BC1 preferably has a shape obtained by the intersection of two discs, which enables it to link the aerostatic thrust with aerodynamic lift related to the wind encountered. In this way, there will be no pulling of the captive-balloon on the floating anchor, which allows the inclination of the rope and consequently the support of the decoy LT1 without the latter tangling with the rope of the floating anchor. In the presence of the floating balloon BF1, the decoy LT1 is pulled downwards and consequently it will be subjected essentially to pivoting movements about itself, a movement whose angular speed is relatively uncertain, since it is linked with the wind in particular. In the presence of incident electromagnetic radiation, the intensity of the retroreflected radiation will be linked directly with the angle at which the incident radiation is seen by each of the trihedrons. There thus results from the said pivoting movement, a component of uncertain fluctuation of amplitude in response, which is presently considered as particularly important in order to obtain a good decoy. In fact, the radar echo for example of a surface ship also has a quite considerable uncertain component, at least for certain areas of the ship.

In the particular case of a carrier captive-balloon in the wind and which thus pulls forcefully on the rope which connects it to its floating anchor, one can envisage the elimination of the balloon BF1, in which case the decoy LT1 is subject not only to a pivotal movement about itself, but also to swinging movements which also contribute to giving realistic characteristics to the retroreflected signal.

In the hypothesis where one uses a single set of trihedrons, in most cases it is desirable to use not a single panel such as LT1, but two panels inclined one with respect to the other, as illustrated at LT2. Very advantageously, the two panels are substantially perpendicular, although a different inclination could be used in certain cases.

It has been observed that two substantially perpendicular panels which are connected by one of their major sides, have a substantially isotropic reflection characteristic, however with small fluctuations, which seem to be due in particular to the fact that the edges of the basic trihedrons are rounded. Another advantage of the use of two panels of trihedrons at right angles is that the retroreflection response nevertheless varies with the angle, it being observed that one of the panels of trihedrons will mask the active surface of the other to a greater or lesser extent, for certain orientations, when the incident radiation arrives by the concave side formed by the decoy.

Figure 2A:
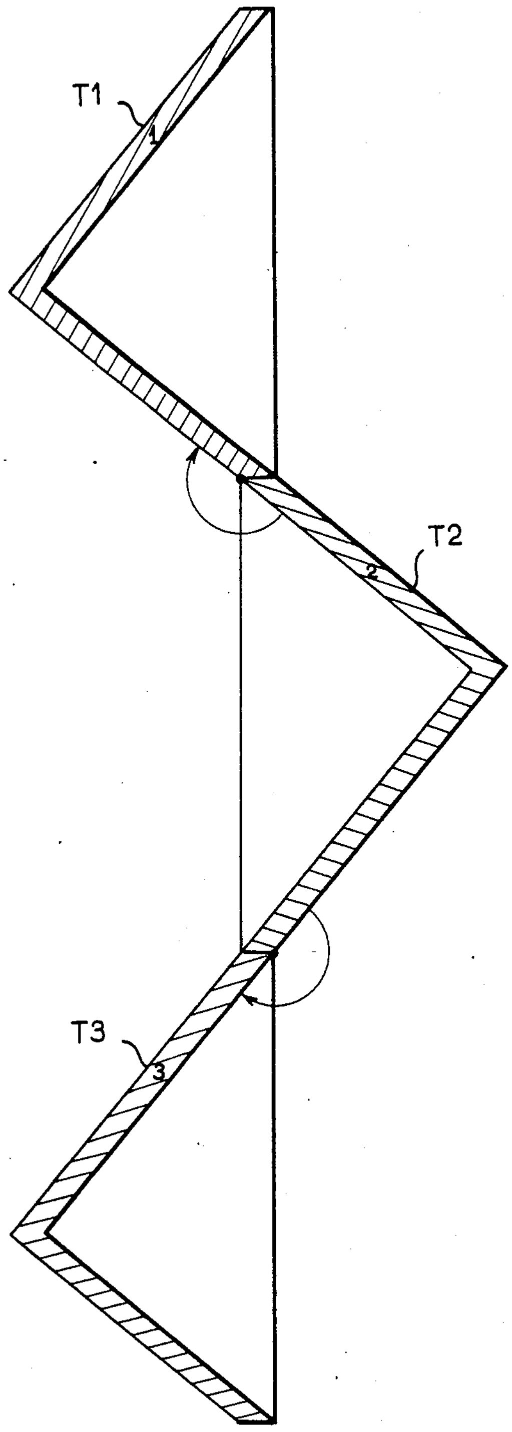
FIGS. 2A and 2B are sectional views showing how the trihedrons of the said panel can be folded one against the other in order to form a compact structure, in the storage position.
Figure 2B:
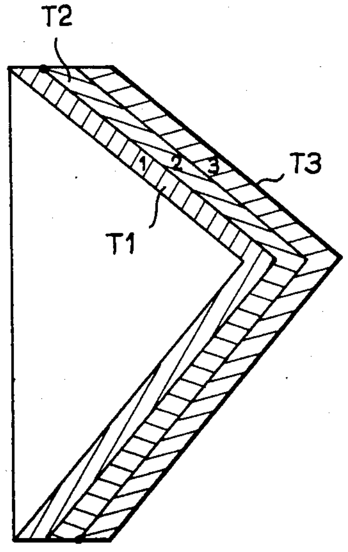

In practical use, starting with the panel of FIG. 1, on at least one of the sides of the panel, it is sufficient to complete the gaps left between the various rows of trihedrons in order to form a continuous line, which is virtually the equivalent of the lines forming a pivot axis of the type PA1. Then, two panels of trihedrons are connected to each other, the panels also being able to be manufactured at the same time by the aforesaid moulding method, in which case the shape of the moulds will take into account not only the pivot axes such as PA1, PA2 . . . , but also a perpendicular pivot axis in the vertical direction. The two panels interconnected in this way will normally be stored flat, folded as shown in FIGS. 2A and 2B. At the time of depolyment, an automatic spreading device will separate the two panels, in order to bring them to the desired angle, whilst at the same time defining suspension means plumb with the center of gravity of the decoy, taking into account the angle between these two panels. This may be obtained in particular by means of the calliper type actuated by a spring or the like.

If we now consider it in its entirety, FIG. 3 shows a substantially horizontal alignment of interconnecting connected sets of trihedrons. In fact, it shows the captive-balloons BC1, BC2, BC3, BC4, whereof the suspension ropes are interconnected by a substantially horizontal main rope F, connected at one end to a pulling member OT which may be a sail, or a gas discharge device or even more simply the parachute which will serve for the descent of the decoy after its release. At its other end, the main rope F is connected to a main floating anchor AFP. Each of the balloons BC1 to BC4 is connected to its secondary floating anchor AFS1 to AFS4. Each of the balloons also receives a decoy LT1 to LT4, which decoy is preferably urged downwards either by a mass which is incorporated therein, or by a floating balloon such as BF1 to BF4 of the type already mentioned.

Preferably, decoys with a single panel are provided at the ends, as shown in this case at LT1 and LT4, whereas at all the intermediate levels, decoys with two perpendicular panels such as LT2 and LT3 are provided.

It has been observed that this arrangement reproduces the "signature" of a ship of considerable surface in electromagnetic radiation, in a very "credible" manner. This apperance may naturally be modified by acting on the formats, distances and altitudes of the sets of decoys.

The fact that the decoys used according to the present invention have excellent retroreflection, gives them an important "equivalent radar surface", which makes it possible to simulate a ship whose physical dimensions are much greater, with devices having a small real surface, suitably arranged one with respect to the other. As mentioned previously, the fact of using decoys with two panels such as LT2 and LT3 at intermediate levels, makes it possible to increase tthe mean level and to simulate the peaks of the signature of a ship, these "peaks" themselves being known in advance, whilst obtaining a component of uncertain fluctuation about these peaks, as has already been mentioned.

On the contrary, it has been observed that the ends of a ship have a radar echo which fluctuates much more, which is advantageously defined in this case by a single panel, whereof the pivoting about itself will produce a fluctuation identifiable with that of the ship.

The presence of the rope F between the various suspended decoys gives the latter on the one hand a spacing which can be chosen in an optimum manner taking into account the "peaks" to be produced and the size of the cells of resolution and of the active electromagnetic detectors. In addition, this rope also ensures a certain correlation as regards the vertical position of the various suspended decoys. Finally, the rope also ensures a certain connection between the movement of the decoy and the movement of the surface of the sea, due to the existence of the floating anchors AFS1 to AFS4.

According to another feature of the invention, this component sensitive to the movement of the sea is increased considerably by the use of the floating members such as the slightly inflated balloons BF1 to BF4, which ensure a much more direct connection between the level of the surface of the sea and the decoys LT1 to LT4. This may be desirable, at least for certain sizes of ship.

Apart from the case of a single decoy, the minimum combination for defining a ship will preferably comprise two decoys at the ends such as LT1 to LT4 surrounding at least one decoy with two panels such as LT2.

For the simulation of a large ship, one could have up to 7 to 10 suspended decoys, the decoys at the ends in this case also being single decoys, whereas the intermediate decoys, or at least the major part of the latter, are decoys comprising two panels.

In the above description, it was mentioned that decoys with two perpendicular panels were desirable on account of their ability to respond in all directions, but with a variable intensity depending on the angle. In cases where more uniform omnidirectionality is desired, one could use decoys with three panels uniformly distributed in the form of a star, or with four perpendicular panels and so on.

One method of employing the decoy according to the invention will now be described with reference to FIGS. 4A to 4D.

Figure 4A:
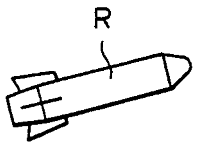
FIGS. 4A to 4D show how the deployment of the decoy according to the present invention can be carried out from a rocket and FIGS. 5 and 6 show diagrammatically the implantation of the various parts of a decoy inside a rocket body.

As shown in FIG. 4A, the decoy may be carried in the desired location by a rocket, which may be the SAGAIE rocket manufactured by the applicant, or by any other launching vehicle, such as those which are incorporated in DAGAIE cases also manufactured by the applicant.

Figure 4B:
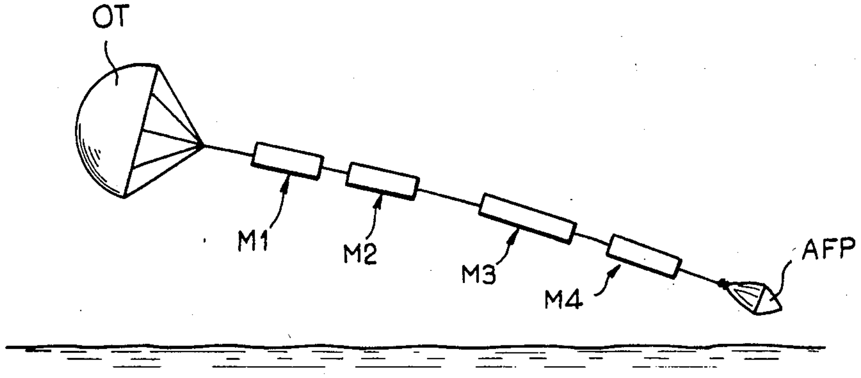
Figure 4C:
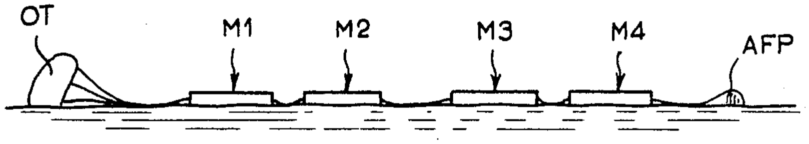
Figure 4D:
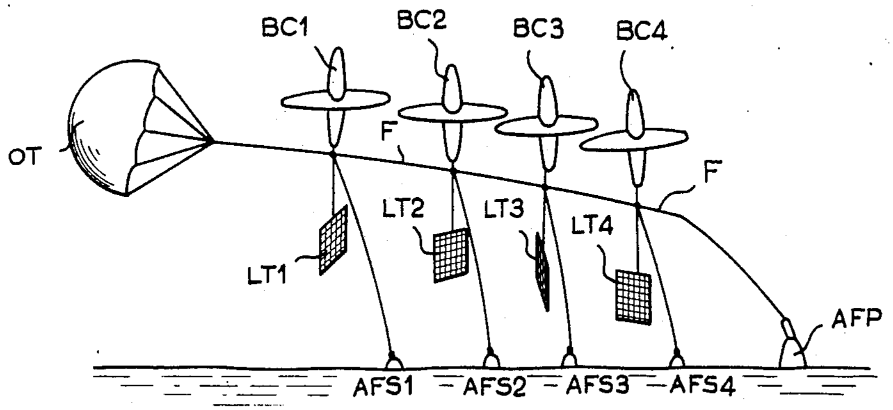

At the end of the trajectory, the launch vehicle releases an arrangement constituted at the head by the main floating anchor AFP, suitably ballasted in order to leave the first and to pull all the modules M4 to M1, finally followed by the rear pulling member OT, which is constituted for example by a parachute capable of forming a sail (FIG. 4B). FIG. 4C shows the arrangent in the position where it has landed on the sea.

Each module such as M1 comprises a captive-balloon such as BC1, a floating anchor AFS1 and the folded decoy such as LT1, possibly with the floating balloon BF1. The module is also completed by a connecting sleeve between the floating anchor AFS1 and the balloon BC1, which sleeve may also ensure the mechanical connection between these two members. The floating anchors may be constituted by bags able to fill with water and the secondary anchors such as AFS1 also comprise a chemical composition such as calcium hydride, which is able to decompose in contact with water in order to produce hydrogen, which hydrogen is transferred by said sleeve to the captive-balloon, which thus inflates. It will be understood immediately that all the captive-balloons will be inflated in this way and mounted together, thus lifting the rope and consequently the decoys. In turn, the parachute OT will gain height and ensures the traction on the end of the rope, if necessary. Since they are folded up initially, the decoys are either unfolded due to the fact that a weight has been added thereto in the lower part, or under the action of the pulling force exerted by the cable which connects them to the floating body such as BF1. One thus obtains the arrangement illustrated in FIG. 4D and which is similar to that of FIG. 3, except for the absence of the floating body such as BF1 and for the simplification of the intermediate decoys. Throttling of the gases which will be produced in each of the secondary floating anchors is advantageously provided, before sending these gases to the balloon, in order to ensure adequate cooling of the latter. The reaction speed of calcium hydride with sea water may also be adjusted in a desired manner in order to obtain steady and progressive ascent characteristics of the captive-balloons in the air.

In certain cases, the main floating anchor AFP could be dispensed with, in which case the latter is replaced by a simple entrainment mass in order to ensure the descent as shown in FIG. 4B.

Finally, the decoy may be easily made self-destructible by incorporating a charge with a suitable delay in each of the captive-balloons, which will ensure the initiation of a reaction between the hydrogen of the balloons and air and consequently the explosion of the latter, the decoy thus falling into the water in its entirety and becoming very difficult to detect.

It will also be noted that the non-wetting side of the surfaces of the reflected trihedrons makes the latter virtually insensitive to the presence of sea water, as regards their characteristics of retroreflection, at least during a time which is sufficiently short with respect to their instant of actuation.

The modules M1 to M4 may be contained in suitable casings, which are sufficiently slack in order to be able to be broken at the time of release of the captive-balloons.

Figure 5:
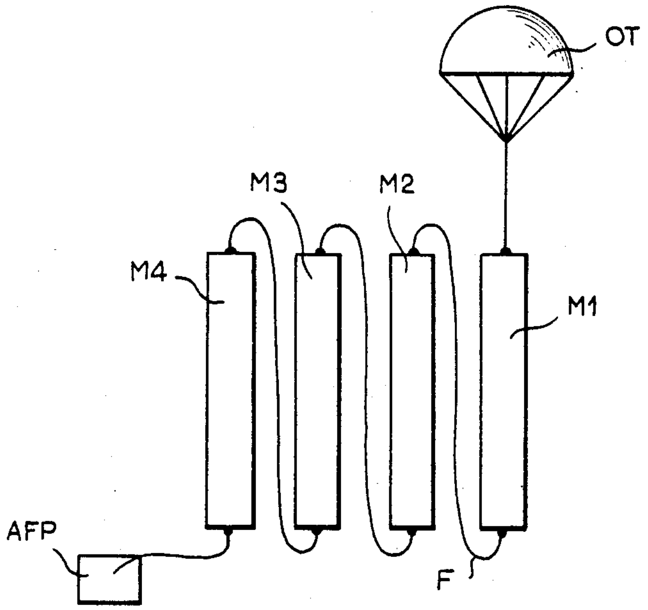

FIG. 5 shows how the various modules may be stored side by side, by connecting them alternately with the bottom of one next to the top of the other, one end being connected to the parachute and the other to the floating anchor.

Figure 6:
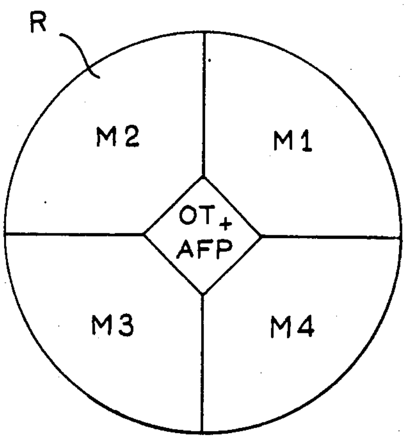

Finally, FIG. 6 shows how the modules connected in this way may be introduced inside the body of a rocket, the various modules M1 to M4 occupying the respective sectors of the cross-section of the rocket, whereas the parachute OT and the floating anchor AFP occupy the two ends of the rocket, possibly passing partly into the central area of the latter.

It should be noted that the folding side of the electromagnetic decoys proposed is considerable for their positioning in the relatively narrow space which is available inside a launch vehicle such as a rocket.

In the preceding description, it has been considered that decoys were retroreflective for electromagnetic radiation emitted by active detectors. These detectors may be of different types, radar, laser.

Naturally, the characteristics of the reflective coatings as well as the geometry of the various trihedrons may be adapted depending on requirements and on the frequency bands in question.

Naturally, the present invention is not limited to the embodiment described, but extends to any variation within its framework.

In certain cases, one could in particular envisage deploying decoys not solely in a main horizontal direction defined by the rope F, but also in the transverse direction. One could also provide sources forming infrared decoys complementing the electromagnetic decoy obtained, in order to perfect simulation. These sources in particular may be incorporated in the secondary floating anchors AFS1 to AFS4, or even in the floating bodies such as BF1 to BF4.

What is claimed is:

1. A method for deceiving active electromagnetic detectors comprising the step of:

deploying at least one decoy at sea between an altitude between 3 and 20 meters having:

at least one panel with a cellular structure defining a network of contiguous, identical retroreflective trihedrons, said structure being reversible, the contigous retroreflective trihedrons being arranged head-to-tail and after deployment defined by immediately adjacent rows of cells in alternating head-to-tail relationship wherein the edges of trihedrons comprising one row touch the edges of trihedrons comprising an immediately adjacent row, said rows being anticulated about axes for mutual pivotal movement in such a way that prior to deployment the rows are folded one on to the other with the cells of the adjacent rows fitting within and receiving one another for enclosure in a launch vehicle wherein the step of deploying comprises firing from an ammunition housing said at least one decoy associated with at least one group of balloons, said balloon groups being adapted for folding to fit inside said ammunition housing together with its associated folded decoy and providing a member for interconnecting said balloons in said group of balloons associated with each of said decoys to keep the interconnected groups in the wind after release, each of said folded balloon groups and respective folded decoys being located adjacent one another in respective cross section sectors within the ammunition housing prior to deployment.

2. A method for deceiving active electromagnetic detectors comprising the steps of:

deploying at least one decoy having:

at least one panel with a cellular structure defining a network of contiguous, identical retroreflective trihedrons, said structure being reversible, the contiguous retroreflective trihedrons being arranged head-to-tail and after deployment defined by immediately adjacent rows of cells in alternating head-to-tail relationship wherein the edges of trihedrons comprising one row touch the edges of trihedrons comprising an immediately adjacent row, said rows being articulated about axes for mutual pivotal movement in such a way that prior to deployment the rows are folded one onto the other with the cells of the adjacent rows fitting within and receiving one another for enclosure in a launch vehicle;

said step of deploying further including:

deploying the decoy at sea at an altitude of between approximately 3 and 20 meters;

spreading a plurality of interconnected decoys in a substantially horizontal alignment, and providing three to ten aligned decoys, the decoys at the ends of the alignment comprising only one panel of trihedrons and at least one decoy intermediate the end decoys comprising two panels of trihedrons set at right angles to one another.

3. A method for deceiving active electromagnetic detectors comprising the step of;

deploying at least one decoy having:

at least one panel with a cellular structure defining a network of contiguous, identical retroreflective trihedrons, said structure being reversible, the contiguous retroreflective trihedrons being arranged head-to-tail and after deployment defined by immediately adjacent rows of cells in alternating head-to-tail relationship wherein the edges of trihedrons comprising one row touch the edges of trihedrons comprising an immediately adjacent row, said rows being articulated about axes for mutual pivotal movement in such a way that prior to deployment the rows are folded one onto the other with the cells of the adjacent rows fitting within and receiving one another for enclosure in a launch vehicle;

said step of deploying including:

suspending each of said decoys from at least one associated captive balloon, and said step of deploying further comprising firing from an ammunition housing said at least one decoy and at least one group of balloons associated with each of said decoys, said balloon groups being adapted for folding to fit inside said ammunition housing together with said at least one decoy having its respective contiguous retroreflective trihedrons arranged head-to-tail and providing a member for interconnecting said balloons in said group of balloons associated with each of said decoys to keep the interconnected group of balloons in the wind after release.

* * * * *

UNITED STATES PATENT AND TRADEMARK OFFICE

CERTIFICATE OF CORRECTION

PATENT NO. : 4,695,841

DATED : September 22, 1987

INVENTOR(S) : Alain Billard

It is certified that error appears in the above-identified patent and that said Letters Patent is hereby corrected as shown below:

On the title page assignee should read

--(73) Assignee: Societe E. Lacroix - Tous Artifices, France --.

Signed and Sealed this

Tenth Day of May, 1988

Attest:

DONALD J. QUIGG

*Attesting Officer*

*Commissioner of Patents and Trademarks*